Patented Aug. 20, 1940

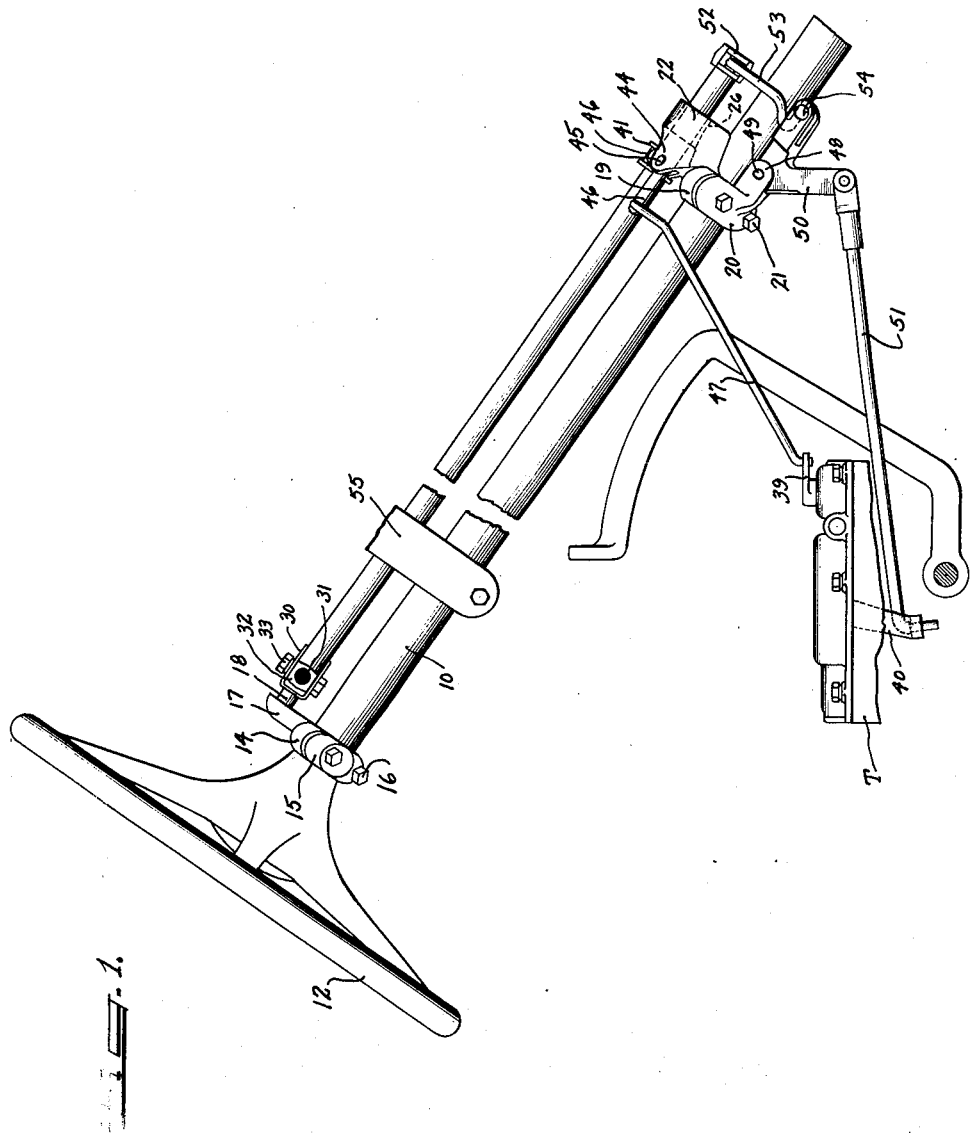

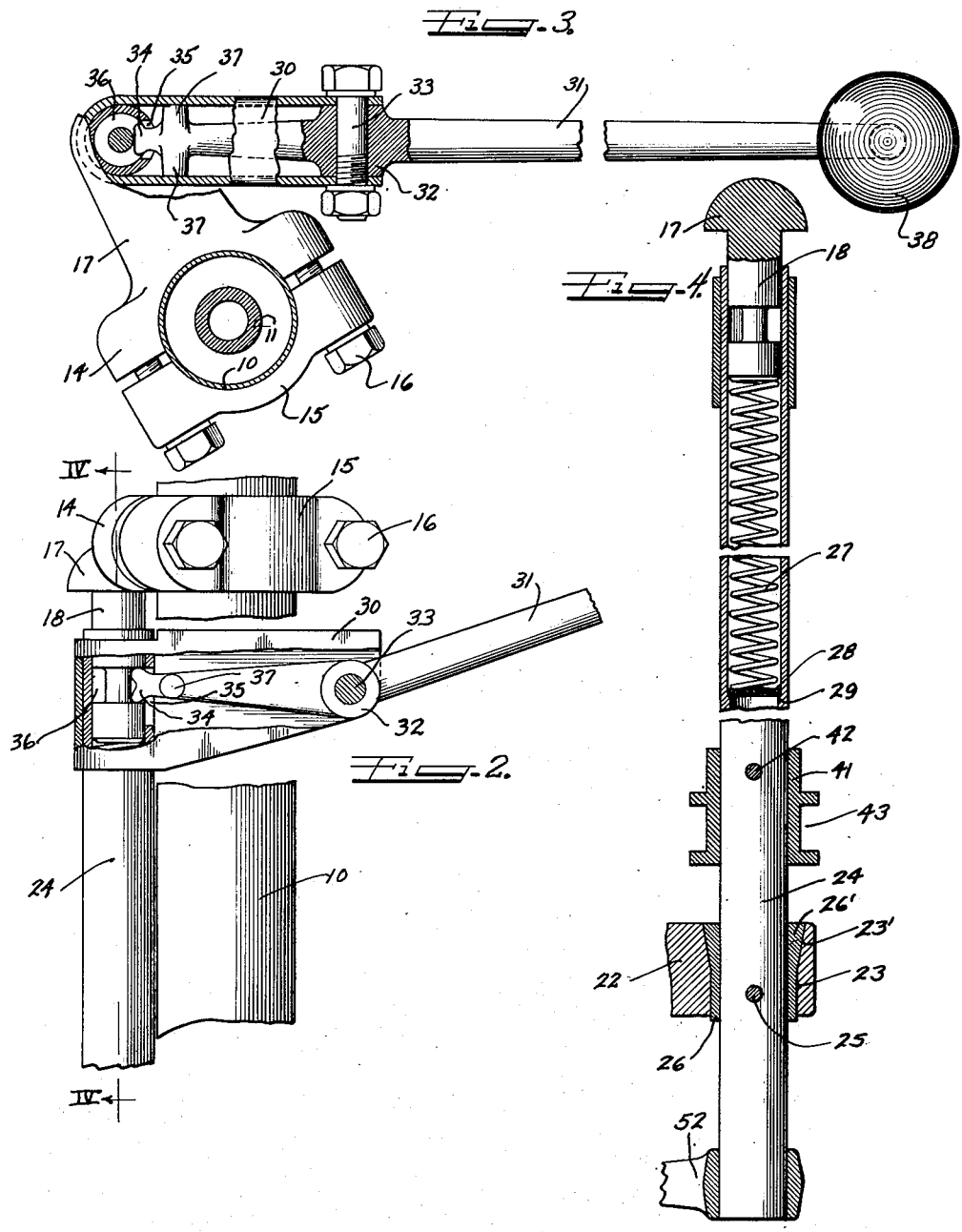

2,211,811

UNITED STATES PATENT OFFICE 2,211,811

TRANSMISSION CONTROL MEANS

Harry L. Chisholm, Jr., Buffalo, N. Y., assignor to Houde Engineering Corporation, Buffalo, N. Y., a corporation of New York Application June 8, 1939, Serial No. 278,058

4 Claims. (Cl. 74—485)

This invention relates to transmission control means, particularly to the selection and shifting of transmission gearing by the manual operation of a lever structure mounted adjacent to the steering wheel of an automotive vehicle. More specifically, the invention relates to control mechanism in which a shaft is connected by suitable linkage with the selection means and the shift controlling means of a transmission assembly, and with the shaft axially shiftable by operation of the manual lever for selection of the desired gearing speed ratio, and with the shaft rotatable by operation of the manual lever for effecting the shifting of the selected gearing.

In control assemblies of the type referred to, there is a tendency for the manual lever and the control shaft to vibrate or chatter during running of the vehicle, such vibration or chattering being communicated through the linkage from the transmission and the motor assembly. An important object of the invention is therefore to provide simple and efficient means for preventing such vibration or chattering, particularly when the vehicle is traveling at the higher speeds.

A further object is to provide improved linkage connection between the control shaft and the selection and shift elements associated with the transmission assembly.

The above and other features of the invention are incorporated in the structure disclosed on the drawings, in which drawings:

Figure 1 is a side elevation of a steering wheel and column, with the control shaft and manual control lever mounted thereon, and the linkage connecting the shaft with the transmission assembly;

Figure 2 is an enlarged front elevation of the upper end of the steering column and the control shaft, and the lever structure partly in section;

Figure 3 is a plan view of the parts shown in Figure 2 but with the lever housing in section on plane III—III, Figure 2;

Figure 4 is a section on plane IV—IV Figure 2.

On the drawings, 10 represents the steering column and 11 the steering shaft which at its upper end has secured thereto the steering wheel 12. Below the steering wheel and adjacent thereto is a detachable clamp on the steering column comprising a body 14 and the clamping head 15 held together by screws 16 to securely clamp the steering column. The body has a laterally extending lug 17 from which a pin 18 depends parallel with the steering column.

A lower clamp on the steering column comprises the body 19 and a clamping head 20 secured together by bolts 21 to securely clamp the steering column. The body 19 has the lateral extension 22 having the bore 23 through which extends a tubular shaft 24, this shaft at its upper end receiving the cylindrical pin 18 which extends from the upper clamp, the shaft being parallel with the steering column. Secured to the shaft as by a pin 25 is a bushing 26 engaging in the bore 23 of the extension 22. The lower part of the bore and the lower part of the bushing are cylindrical but the upper part 23' of the bore is conical to receive the conical upper part 26' of the bushing. Within the tubular shaft is a pre-tensioned spring 27 abutting the lower end of the pin 18 and a disk 28 seated on a shoulder 29 provided in the shaft, this spring tending to hold the shaft down with the cylindrical and conical parts of the bushing in engagement with the cylindrical and conical parts of the bore, the frictional engagement of the bushing in the bore tending to prevent vibration of the shaft during running of the vehicle.

A housing 30 of inverted U-shaped cross section receives at its inner end the upper end of the shaft 24 and is secured thereto, as by welding, to extend laterally therefrom. The housing extends toward the right from the shaft and a hand lever 31 extends into the housing and has the hub 32 for receiving a pivot bolt 33 extending through the front and rear walls of the housing at the end thereof. The inner end 34 of the lever 31 extends through an opening 35 in the shaft for engagement in the circumferential channel 36 in the pin 18. The upper and lower sides of the end 34 are rounded for engagement with the upper and lower walls of the pin 18 surrounding the channel 36, as clearly shown in Figure 2. Inwardly of the end 34, the lever has laterally extending guide lugs 37 for engaging with the front and rear walls of the housing 30 for guiding of the lever 31.

In the arrangement shown, lateral swing of the lever and the housing 30 will rotate the shaft 24, while upward pressure or pull exerted on the lever end will raise the lever and the housing by virtue of the fulcrum connection of the lever end 34 with the stationary pin 18, and the shaft 24 will be shifted axially upwardly, such upward shift of the shaft being guided by the engagement of the shaft with the pin 18 and the engagement of the bushing 26 in the bore 23. The lever 31 may terminate at its outer end in an upwardly extending knob 38 which will be adjacent to the rim of the steering wheel for convenient manipulation of the lever 31.

Referring to Figure 1, T indicates a transmission housing. A lever 39 extends from speed selection mechanism (not shown) within the transmission housing, and another lever 40 extends from the gear shifting controlling mechanism within the transmission housing. Secured to the shaft 24 a distance above the extension 22 of the lower clamp 19 is a sleeve 41, the securing means being shown as a pin 42. This sleeve provides a circumferentially extending channel 43. The extension 22 has a pair of ears 44 extending upwardly therefrom through which extends a pivot pin 45 for pivoting a bell crank lever 46. The laterally extending leg of the lever engages in the channel 43 of the sleeve 41, while the upwardly extending leg of the lever is connected by a link 47 with the lever 39 for the speed selection means within the transmission housing 10. When the shaft 24 is shifted axially upwardly, the bell crank lever will be rotated in counterclockwise direction (Figure 1) for movement of the link 47 for setting of the lever 39 and the speed selection means, and when the shaft is shifted down to its normal position the lever 39 will be returned to its normal position, the axial shifting of the shaft 24 thus controlling the speed selection means within the transmission housing.

The head 20 for the lower clamp on the steering column has depending ears 48 for supporting a pin 49 which pivots another bell crank lever 50. One leg of this lever is connected by link 51 with the shift controlling lever 40 extending from the transmission housing. Extending from the lower end of the shaft 24 is a lever 52 to whose outer end a link 53 is pivoted, the other end of the link being deflected at an angle to extend into the bifurcated end of the other leg of the bell crank lever 50 and through an opening in the pin 54 extending through the lever bifurcated end. With this arrangement, rotation of the shaft 24 will effect swing of the lever 40 for controlling the shift of the selected transmission gearing in the transmission housing.

The shaft 24 may be further held in alignment relative to the steering column by a bracket 55 clamped to the steering column and this bracket may extend to and be secured to the instrument board or dashboard for support of the steering column.

The manual lever 31 is laterally operable in a lower selection field or in an upper selection field, operation in the lower field being for shifting for either second or high speed, while its operation in the upper field being for shifting for either forward speed or reverse. The spring tends to hold the shaft down with the lever in its lower or normal field, the pressure of the spring against the shaft holding the conical bushing 26 intimately against the conical portion of the bore 23 so that the friction will prevent axial vibration or chattering of the shaft and of the manual lever during operation of the vehicle at the higher speeds, the friction engagement, however, being insufficient to prevent convenient rotation of the shaft by the manual lever for the shifting operation. When the manual lever and shaft are raised for shift operation of the hand lever in the upper plane, such raising will, through the linkage 46 and 47, set the selection means within the transmission housing for either low speed or reverse and then shift for either forward or reverse will be accomplished by swing of the hand lever laterally for rotation of the shaft 24 and shift of the transmission through the linkage connected between the lever 52 on the shaft and the shift lever 40 at the transmission assembly. During such shifting for forward or reverse, the bushing 26 will be shifted upwardly in the bearing bore 23 and the conical parts of the bore and bushing will be disengaged, but the cylindrical parts will remain in engagement for guiding the shift. Such disengagement of the conical portions will be only temporary as very little travel is done at forward or reverse speeds and such speeds will not produce any vibration or chattering of the shaft and end lever. However, as soon as the shaft and hand lever are reset to the normal plane for intermediate and high speed travel, the conical portions of the bushing and bore will engage for preventing vibration.

I have shown a practical and efficient embodiment of the various features of my invention but I do not desire to be limited to the exact construction, arrangement and operation shown and described as changes and modifications may be made without departing from the scope and spirit of the invention.

I claim as follows:

1. In combination, the steering wheel column of an automotive vehicle, a control shaft extending parallel with said column, bearings on said column for said shaft for rotary and axial movement thereof, a control lever for controlling the axial and rotary movements of said shaft, one of said shaft bearings being conical, a conical bushing on the shaft for engaging said conical bearing, a spring acting on said shaft and tending to hold it in position for frictional engagement of said conical bushing and bearing whereby to prevent vibration of said shaft and lever during operation of the vehicle, and means for transmitting the rotational and axial movements of said shaft for selection and shifting of transmission gearing.

2. In combination, the steering wheel column of an automotive vehicle, a control shaft extending parallel with said column along one side thereof, upper and lower bearing supports for said shaft on said column, said upper support having a depending cylindrical part receiving the upper end of said shaft for axial and rotary movement relative thereto, a housing secured to and extending laterally from the upper end of said shaft, a manual lever pivoted in said housing, said depending bearing part having a recess and said shaft having an opening adjacent to said recess, the inner end of said lever extending through said opening and engaging in said recess whereby said lever is fulcrumed on said depending bearing part and whereby upward pressure on said lever will raise said housing and shaft, means for transmitting the axial movement of said shaft to speed selection means within a transmission assembly, means transmitting the rotary movement of said shaft to gear shifting controlling means within the transmission assembly, a spring within said shaft tending to hold it normally in its lower position, and friction means cooperable with said lower bearing for preventing vibration of the shaft.

3. In combination, the steering wheel column of an automotive vehicle, a control shaft extending parallel with said column at one side thereof, a lower bearing support on said column in which said shaft is axially movable, an upper bearing support on said column having a depending cylindrical extension receiving the upper hollow end of said shaft for rotational and axial movement of the shaft relative thereto, a housing secured to and extending laterally from said shaft adjacent to said extension, said extension having a recess and said shaft having an opening adjacent to said recess, a manually operable lever pivoted to and extending laterally from said housing and having its inner end projecting through the shaft opening into said extension recess whereby said lever will be fulcrumed at its inner end on said extension so that upward pressure on the lever will raise said housing and the shaft therewith, means for transmitting the axial upward movement of said shaft to gear selection means within a transmission assembly, means for transmitting the rotational movement of said shaft to gear shifting means within the transmission assembly, a conical bushing on said shaft engaging with the lower bearing part on said column and a spring within said shaft abutting said shaft and said bearing extension and operable to hold said conical bushing in friction engagement with the bearing support when said shaft is in its lower normal position whereby to prevent vibration or chattering of the shaft and the manual lever extending therefrom.

4. In combination, the steering wheel column of an automotive vehicle, a control shaft extending parallel with said column at one side thereof, bearing supports on said column for said shaft for rotation and axial movement of the shaft, a manually operable lever extending from the upper end of said shaft for effecting the rotation and axial movement of said shaft, a bell crank lever pivoted on one of said bearing supports and means on said shaft for rotating said lever when said shaft is moved axially, linkage connecting said lever with selection means within a transmission assembly, a second bell crank lever on said one bearing support, a lever arm extending from said shaft linked to said second bell crank lever, and linkage connecting said second bell crank lever with shifting means within the transmission assembly for effecting shift of selected gearing when said shaft is turned.

HARRY L. CHISHOLM, Jr.